Patented Apr. 7, 1942

2,278,802

UNITED STATES PATENT OFFICE 2,278,802

COMPOSITE PRODUCT COMPRISING NATURAL RUBBER AND SYNTHETIC RUBBER AND METHOD FOR MAKING THE PRODUCT

Donald V. Sarbach, Cuyahoga Falls, Ohio, assignor to The B. F. Goodrich Company, New York, N. Y., a corporation of New York No Drawing. Application March 19, 1941, Serial No. 384,142

14 Claims. (Cl. 154—2)

This invention relates to composite rubber products and articles comprising natural rubber bonded to synthetic rubber, and to a method of making the same. More particularly this invention relates to composite products comprising natural rubber bonded to a rubber-like copolymer of a conjugated diene hydrocarbon and an alpha methylene carboxylic acid nitrile such as the acrylic nitriles.

It is well known that rubber-like copolymers prepared by the copolymerization of a conjugated diene hydrocarbon such as butadiene and an alpha methylene carboxylic acid nitrile, particularly the acrylic nitriles, such as acrylonitrile, methacrylonitrile or ethacrylonitrile or, in general, a compound of the formula

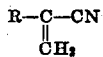

where R represents hydrogen or an alkyl radical, are superior to natural rubber in regard to a great many properties. For example, they have much greater resistance to oils and to solvents, to oxidation and to aging, and to abrasion. However, the prohibitive cost of these rubber-like materials has somewhat prevented their extensive usage as a direct replacement for natural rubber even in the manufacture of articles in which the properties possessed by these materials are necessary or extremely desirable. Moreover it has hitherto been impossible to employ constructions in which only a part of the article is made of the rubber-like material while the remainder is made of natural rubber because of the great difficulty in adhering these rubber-like copolymers to natural rubber. This difficulty of adhering rubber-like butadiene acrylic nitrile copolymers to natural rubber presents a serious problem which heretofore has not been solved. Even the employment of tie-plies containing successively smaller proportions of the copolymer and larger proportions of natural rubber has often failed to provide a satisfactory bond for these two materials.

I have now discovered that rubber-like butadiene acrylic nitrile copolymers, particularly those prepared by the emulsion polymerization of a mixture containing from 30 to 50 per cent by weight of the nitrile or compositions containing such copolymers may be adhered to natural rubber or natural rubber compositions by the use of an interposed bonding agent which contains a rubber-like copolymer of a conjugated diene hydrocarbon such as butadiene, and an alpha methylene carboxylic acid ester, particularly the acrylic or methacrylic esters such as methyl acrylate, methyl methacrylate, ethyl acrylate, ethyl methacrylate, butyl acrylate, butyl methacrylate, or the like or in general a compound of the formula

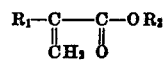

wherein R is hydrogen or alkyl and $R_2$ is a lower alkyl radical. Such copolymers are preferably prepared by the emulsion polymerization of a mixture of butadiene and the ester, the mixture containing more than 50% by weight of butadiene.

The advantages of being able to make composite products and articles in which natural rubber is firmly adhered to a rubber-like copolymer of butadiene and an acrylic nitrile will be readily apparent to those skilled in the art of fabricating rubber articles since many articles can be made in which only a certain part or parts are made of the rubber-like copolymer while some other part or parts are made of natural rubber. For example, a gasoline hose may now be manufactured which has the hose tube made of a butadiene acrylic nitrile copolymer so that it will withstand the solvent action of gasoline or the like, and the ply or cover made of natural rubber bonded to the tube by the method of this invention. As another instance, in the manufacture of printing rollers, these can now be made with an outer cover of the rubber-like copolymer bonded to a core of natural rubber so that the outer parts which are liable to come into contact with oils will be oil resistant. Tires may be made having a highly abrasive resistant tread made of a butadiene acrylic nitrile copolymer bonded to a natural rubber carcass, natural rubber water bottles may be lined with such copolymers and many other articles may be made embodying the construction made possible by this invention.

Since the finished articles which are made embodying the construction of this invention are practically always vulcanized articles, the practice of the invention usually involves the adhesion, before cure, of a compounded natural rubber stock containing the usual compounding ingredients such as softeners, pigments and vulcanizing ingredients, to a compounded butadiene acrylic nitrile copolymer stock which also contains the usual compounding ingredients by means of an interposed bonding agent which includes a copolymer of butadiene and an acrylic or methacrylic ester to produce a composite unvulcanized product, and then the simultaneous vulcanization of the layers of this composite product during which the adhesion between the various compounds is materially increased.

Although the bonding agent may consist simply of a compounded copolymer of butadiene and an acrylic or methacrylic ester, better results are obtained when a blend of this type copolymer and natural rubber is employed as the bonding agent. Still better results are obtained if the bonding agent consists of a plurality of layers or tie-plies interposed between the butadiene acrylonitrile copolymer stock and the natural rubber stock. In this preferred construction it is desirable to employ at least two tie plies, the ply adjacent to the natural rubber stock consisting of a compound containing both natural rubber and a copolymer of butadiene and an acrylic or methacrylic ester while the ply adjacent to the butadiene acrylonitrile copolymer stock consists of a compound containing both natural rubber and a butadiene acrylic nitrile copolymer. A third ply consisting also of a compound containing both natural rubber and a copolymer of butadiene and an acrylic or methacrylic ester may be inserted between the two other tie-plies or adjacent to the natural rubber stock, if desired, but the ply adjacent the natural rubber stock should contain a higher proportion of natural rubber than the intermediate ply. This preferred construction may be illustrated by the following example:

EXAMPLE I

Three mixes are made as follows:

No. 1

| | Parts by weight |
|---|---|
| Butadiene acrylonitrile copolymer prepared by the polymerization of a mixture containing 45% by weight of acrylonitrile | 75.0 |
| Natural rubber (masticated pale crepe) | 25.0 |
| A polymerized cashew nut shell oil sold commercially under the trade name "Cardolite 816" | 25.0 |
| Zinc oxide | 5.0 |
| Channel black | 50.0 |
| Phenyl beta naphthylamine | 1.5 |
| Lauric acid | 1.5 |
| Benzo thiazyl disulfide | 2.0 |
| Sulfur | 2.0 |

No. 2

| | Parts by weight |
|---|---|
| Butadiene methyl methacrylate copolymer prepared by the emulsion polymerization of a mixture containing 70% by weight of butadiene | 75.0 |
| Natural rubber (masticated pale crepe) | 25.0 |
| A polymerized cashew nut shell oil sold commercially under the trade name "Cardolite 816" | 25.0 |
| Zinc oxide | 5.0 |
| Channel black | 50.0 |
| Phenyl beta naphthylamine | 1.5 |
| Lauric acid | 1.5 |
| Benzo thiazyl disulfide | 1.5 |
| Sulfur | 3.0 |

No. 3

| | Parts by weight |
|---|---|
| Natural rubber (masticated pale crepe) | 100.0 |
| A polymerized cashew nut shell oil sold commercially under the trade name "Cardolite 816" | 25.0 |
| Zinc oxide | 5.0 |
| Channel black | 50.0 |
| Phenyl beta naphthylamine | 1.5 |
| Lauric acid | 1.5 |
| Benzo thiazyl disulfide | 0.8 |
| Sulfur | 3.5 |

Each of these compounds is mixed well and then remilled after standing to insure good dispersion. Each compound is then sheeted out about 1/32 inch thick and the three are plied up with number 2 in the center and cured in a press for forty five minutes at 300° F. After standing overnight the adhesion between compound No. 1 and compound No. 2 as tested on the Goodrich Autographic machine is found to be 35 pounds to separate a one inch strip at the rate of one inch per minute. When similarly tested the adhesion between compound No. 2 and compound No. 3 is found to be 20 pounds.

When adhering a stock containing a butadiene acrylonitrile copolymer as the sole vulcanizable material to a stock containing natural rubber as the sole vulcanizable material in commercial practice it is desirable to construct three tie-plies of the compositions set forth above and then to calender or ply up the three compositions in the order No. 1, No. 2, No. 3. These tie-plies are then used as the bonding agent for adhering the butadiene acrylonitrile copolymer stock to the natural rubber stock, using ply No. 1 adjacent to the butadiene acrylonitrile copolymer stock and ply No. 3 adjacent to the natural rubber stock. When the various compositions are plied up in this order and then vulcanized in any convenient manner such as by a press cure, excellent adhesion is obtained between all the various layers.

In the example above the adhesion may be improved if in the No. 3 composition a portion of the natural rubber be replaced by a butadiene methyl methacrylate copolymer. Such a construction is illustrated by Example 2.

EXAMPLE 2

Three mixes are prepared as in Example 1. Compound No. 1 and Compound No. 2 are identical with those used in Example 1. Compound No. 3 is made up as follows:

| | Parts by weight |
|---|---|
| Natural rubber (masticated pale crepe) | 75.0 |
| Butadiene methyl methacrylate copolymer prepared by the emulsion polymerization of a mixture containing 70% by weight of butadiene | 25.0 |
| A polymerized cashew nut shell oil sold commercially under the trade name "Cardolite 816" | 25.0 |
| Zinc oxide | 5.0 |
| Channel black | 50.0 |
| Phenyl beta naphthylamine | 1.5 |
| Crude lauric acid | 1.5 |
| Benzo thiazyl disulfide | 0.75 |
| Sulfur | 3.25 |

These three compounds are plied up in the order No. 1, No. 2, No. 3, cured and the adhesion tested as in Example 1. The adhesion found for the various cures is as follows:

| Cure | Adhesion between No. 1 and No. 2 | Adhesion between No. 2 and No. 3 |
|---|---|---|
| | Pounds | Pounds |
| 30 minutes at 300° F | 88.0 | 22.5 |
| 60 minutes at 300° F | 100.0 | 52.0 |

Three tie plies of these three compositions are employed as a bonding agent for the adhesion of a butadiene acrylonitrile copolymer stock to a natural rubber stock in the order:

|  | Comp. No. 1 | Comp. No. 2 | Comp. No. 3 | Natural rubber stock |
|---|---|---|---|---|
| Butadiene Acrylonitrile copolymer Stock |  |  |  |  |

After vulcanization an excellent adhesion between the two stocks is obtained.

It is to be understood that Examples 1 and 2 have been cited merely as suitable illustrations for the practice of this invention and are in no way intended to limit the invention thereto. Constructions may be employed, as mentioned hereinabove, in which only one or two tie-plies or more than three tie-plies are included in the bonding agent. However, the three tie-ply construction is preferred.

The proportions of the vulcanizable materials used in the various layers or plies of the bonding agent may be varied somewhat from those employed in Examples 1 and 2. However, the layer to be used adjacent to the butadiene acrylonitrile copolymer stock should contain a larger proportion of a butadiene acrylonitrile copolymer than natural rubber. From 60 to 80 parts of the copolymer and from 20 to 40 parts of natural rubber in this layer are most desirable. The natural rubber in this ply may also be replaced wholly or in part with a copolymer of butadiene and an acrylic or methacrylic ester. The layer to be used next to this layer should contain a larger proportion of a copolymer of butadiene and an acrylic or methacrylic ester than of natural rubber. From 60 to 80 parts of the copolymer and from 20 to 40 parts of natural rubber are most desirable. However, this compound may also contain up to 30 parts of a butadiene acrylic nitrile copolymer with a corresponding reduction of the copolymer of butadiene and an acrylic or methacrylic ester, so that the compound is based on a total of 100 parts of vulcanizable material. For example, a compound based on 50 parts of a butadiene methyl methacrylate copolymer, 25 parts of a butadiene acrylonitrile copolymer and 25 parts of natural rubber is desirable for use in this intermediate layer. The layer to be used adjacent to the natural rubber composition may contain only natural rubber as the vulcanizable material or it may contain up to 25 parts of a copolymer of butadiene and an acrylic or methacrylic ester with a total of 100 parts of vulcanizable material.

The compounding of the several compositions used in the preparation of the tie-plies may be varied somewhat but best results are obtained when all the compositions used are compounded in substantially the same manner. The amount and type of softener is of greatest importance in the selection of compounding ingredients since the softener used in each composition should be miscible in the other compositions. Suitable softeners for use in all of the compositions are, for example, polymerized cashew nut shell oil and coal tar and cumar resins. The amount of softener used may vary from 5 to 50 parts to 100 parts of vulcanizable material, about 25 parts being satisfactory for most compounds. The nature and amount of the pigments employed may be varied widely but it is most desirable to use a rather high degree of pigmentation in all the tie-ply compositions. Any of the ordinary curing ingredients such as sulfur and any of the ordinary accelerators of vulcanization may be employed but it is desirable to adjust these ingredients so that all the compositions to be simultaneously cured will have approximately the same rate of cure.

One very desirable compounding procedure is to compound each of the compositions to be used as tie-plies in a different color by the use of appropriate colored compounding ingredients. In this way it is possible to recognize easily the layer which is to be applied next to the natural rubber stock and the layer which is to be applied next to the synthetic rubber-like copolymer stock. The expedient is of great advantage when the invention is applied in commercial practice in the factory.

It is to be understood that throughout the specification and claims the term "natural rubber" is used in a generic sense to include all those materials derived from natural sources which may be converted from an essentially plastic mass to an essentially elastic mass by vulcanization with sulfur such as caoutchouc, balata, gutta percha, guayule and like gums, and reclaimed rubber.

I claim:

1. A composite product comprising a natural rubber composition, and a rubber-like composition including a copolymer of butadiene and acrylonitrile adhered to said natural rubber composition by an interposed bonding means; said bonding means including a layer, adjacent the natural rubber composition, comprising natural rubber and a copolymer of butadiene and an acrylic ester in which the natural rubber constitutes at least 20% by weight of the vulcanizable material, and a layer, adjacent the rubber-like composition, comprising a copolymer of butadiene and acrylonitrile and a lesser amount of natural rubber.

2. A composite product comprising a natural rubber composition, a rubber-like composition including a copolymer of butadiene and acrylonitrile and an interposed bonding means; said bonding means including a plurality of layers each of which contains natural rubber, the layer adjacent the rubber-like composition also containing a greater amount of a copolymer of butadiene and acrylonitrile and the next adjacent layer also containing a greater amount of a copolymer of butadiene and a methacrylic ester.

3. A composite product comprising a vulcanized natural rubber composition, a vulcanized rubber-like composition including a copolymer of butadiene and an alpha methylene carboxylic acid nitrile and an interposed bonding means composed of vulcanized material; said bonding means including a layer, adjacent the natural rubber composition, comprising natural rubber and a copolymer of butadiene and an alpha methylene carboxylic acid ester in which the natural rubber constitutes at least 20% by weight of the vulcanizable material, and a layer, adjacent the rubber-like composition, comprising a copolymer of butadiene and an alpha methylene carboxylic acid nitrile and a lesser amount of natural rubber.

4. A composite product comprising a vulcanized natural rubber composition, a vulcanized butadiene acrylonitrile copolymer composition and an interposed bonding means composed of vulcanized material; said bonding means including a layer, adjacent the natural rubber composition, comprising natural rubber and a lesser amount of a copolymer of butadiene and an acrylic ester, an intermediate layer comprising a copolymer of butadiene and an acrylic ester and a lesser amount of natural rubber, and a layer, adjacent the butadiene acrylonitrile copolymer composition, comprising a butadiene acrylonitrile copolymer and a lesser amount of natural rubber.

5. A composite product comprising a vulcanized natural rubber composition, a vulcanized butadiene acrylonitrile composition in which the copolymer is prepared by the emulsion polymerization of a mixture containing from 30 to 50 per cent by weight of acrylonitrile, and an interposed bonding means composed of vulcanized material; said bonding means including a layer, adjacent the natural rubber composition, of a composition comprising from 75 to 100 parts of natural rubber and not more than 25 parts of a butadiene methyl methacrylate copolymer prepared by the emulsion polymerization of a mixture containing over 50% by weight of butadiene, an intermediate layer of a composition comprising from 20 to 40 parts of natural rubber and from 60 to 80 parts of a butadiene methyl methacrylate copolymer prepared by the emulsion polymerization of a mixture containing over 50% by weight of butadiene and a layer, adjacent the butadiene acrylonitrile copolymer composition, of a composition comprising from 20 to 40 parts of natural rubber and from 60 to 80 parts of a butadiene acrylonitrile copolymer prepared by the emulsion polymerization of a mixture containing from 30 to 50 per cent by weight of acrylonitrile.

6. A composite product comprising a vulcanized natural rubber composition, a vulcanized butadiene acrylonitrile copolymer composition in which the copolymer is prepared by the emulsion polymerization of a mixture containing from 30 to 50 per cent by weight of acrylonitrile, and an interposed bonding means composed of vulcanized material; said bonding means including a layer, adjacent the natural rubber composition, of a composition comprising from 75 to 100 parts of natural rubber and not more than 25 parts of a butadiene methyl acrylate copolymer prepared by the emulsion polymerization of a mixture containing over 50% by weight of butadiene, an intermediate layer of a composition comprising from 20 to 40 parts of natural rubber and from 60 to 80 parts of a butadiene methyl acrylate copolymer prepared by the emulsion polymerization of a mixture containing over 50% by weight of butadiene, and a layer, adjacent the butadiene acrylonitrile copolymer composition, of a composition comprising from 20 to 40 parts of natural rubber and from 60 to 80 parts of a butadiene acrylonitrile copolymer prepared by the emulsion polymerization of a mixture containing from 30 to 50 per cent by weight of acrylonitrile.

7. A composite product comprising a vulcanized natural rubber composition, a vulcanized butadiene acrylonitrile copolymer composition and an interposed bonding means composed of vulcanized material, said bonding means including a layer, adjacent the natural rubber composition, comprising natural rubber and a lesser amount of a copolymer of butadiene and a methacrylic ester, an intermediate layer comprising a copolymer of butadiene and a methacrylic ester and a lesser amount of natural rubber, and a layer, adjacent the butadiene acrylonitrile copolymer composition, comprising a butadiene acrylonitrile copolymer and a lesser amount of natural rubber, each of said layers in said bonding means containing substantially the same amount of softener and having been cured under substantially the same conditions.

8. The method of making a composite product which comprises securing a natural rubber composition to a rubber-like composition including a copolymer of butadiene and acrylonitrile by interposing between said compositions an intermediate bonding means; said bonding means including a layer, adjacent the natural rubber composition, comprising natural rubber and a copolymer of butadiene and acrylic ester in which the natural rubber constitutes at least 20% by weight of the vulcanizable material, and a layer, adjacent the rubber-like composition, comprising a copolymer of butadiene and acrylonitrile and a lesser amount of natural rubber.

9. The method of making a composite product which comprises securing a natural rubber composition to a rubber-like composition including a copolymer of butadiene and acrylonitrile by interposing between said composition an intermediate bonding means; said bonding means including a plurality of layers each of which contains natural rubber, the layer adjacent the rubber-like composition also containing a greater amount of a copolymer of butadiene and acrylonitrile and the next adjacent layer also containing a greater amount of a copolymer of butadiene and a methacrylic ester.

10. The method of making a composite product which comprises interposing a bonding means between an unvulcanized compounded natural rubber composition and an unvulcanized compounded rubber-like composition comprising a copolymer of butadiene and an alpha methylene carboxylic acid nitrile; said bonding means including a layer, adjacent the natural rubber composition, of an unvulcanized compounded composition comprising natural rubber and a copolymer of butadiene and an alpha methylene carboxylic acid ester in which the natural rubber constitutes at least 20% by weight of the vulcanizable material, and a layer, adjacent the rubber-like composition, of an unvulcanized compounded composition comprising a copolymer of butadiene and an alpha methylene carboxylic acid nitrile and a lesser amount of natural rubber, bringing the materials into intimate contact and then vulcanizing.

11. The method of making a composite product which comprises interposing a bonding means between an unvulcanized compounded natural rubber composition and an unvulcanized compounded butadiene acrylonitrile copolymer composition; said bonding means including a layer, adjacent the natural rubber composition, of an unvulcanized compounded composition comprising natural rubber and a lesser amount of a copolymer of butadiene and an acrylic ester, an intermediate layer of an unvulcanized compounded composition comprising a copolymer of butadiene and an acrylic ester and a lesser amount of natural rubber, and a layer, adjacent the butadiene acrylonitrile copolymer composition, of an unvulcanized compounded composition comprising a butadiene acrylonitrile copolymer and a lesser amount of natural rubber, bringing the materials into intimate contact and then vulcanizing.

12. The method of making a composite product which comprises interposing a bonding means between an unvulcanized compounded natural rubber composition and an unvulcanized compounded butadiene acrylonitrile copolymer composition in which the copolymer is prepared by the emulsion polymerization of a mixture containing from 30 to 50 per cent by weight of acrylonitrile; said bonding means including a layer, adjacent the natural rubber composition, of an unvulcanized compounded composition comprising from 75 to 100 parts of natural rubber and not more than 25 parts of a butadiene methyl methacrylate copolymer prepared by the emulsion polymerization of a mixture containing over 50% by weight of butadiene, an intermediate layer of an unvulcanized compounded composition comprising from 20 to 40 parts of natural rubber and from 60 to 80 parts of a butadiene methyl methacrylate copolymer prepared by the emulsion polymerization of a mixture containing over 50% by weight of butadiene, and a layer, adjacent the butadiene acrylonitrile copolymer composition, of an unvulcanized compounded composition comprising from 20 to 40 parts of natural rubber and from 60 to 80 parts of a butadiene acrylonitrile copolymer prepared by the emulsion polymerization of a mixture containing from 30 to 50 per cent by weight of acrylonitrile, bringing the materials into intimate contact and then vulcanizing.

13. The method of making a composite product which comprises interposing a bonding means between an unvulcanized compounded natural rubber composition and an unvulcanized compounded butadiene acrylonitrile copolymer composition in which the copolymer is prepared by the emulsion polymerization of a mixture containing from 30 to 50 per cent by weight of acrylonitrile, said bonding means including a layer, adjacent the natural rubber composition, of an unvulcanized compounded composition comprising from 75 to 100 parts of natural rubber and not more than 25 parts of a butadiene methyl acrylate copolymer prepared by the emulsion polymerization of a mixture containing over 50% by weight of butadiene, an intermediate layer of an unvulcanized compounded composition comprising from 20 to 40 parts of natural rubber and from 60 to 80 parts of a butadiene methyl acrylate copolymer prepared by the emulsion polymerization of a mixture containing over 50% by weight of butadiene, and a layer, adjacent the butadiene acrylonitrile copolymer composition, of an unvulcanized compounded composition comprising from 20 to 40 parts of natural rubber and from 60 to 80 parts of a butadiene acrylonitrile copolymer prepared by the emulsion polymerization of a mixture containing from 30 to 50 per cent by weight of acrylonitrile, bringing the materials into good contact and then vulcanizing.

14. The method of making a composite product which comprises interposing a bonding means between an unvulcanized compounded natural rubber composition and an unvulcanized compounded butadiene acrylonitrile copolymer composition, said bonding means including a layer, adjacent the natural rubber composition, of an unvulcanized compounded composition comprising natural rubber and a lesser amount of a copolymer of butadiene and a methacrylic ester, an intermediate layer of an unvulcanized compounded composition comprising a copolymer of butadiene and a methacrylic ester and a lesser amount of natural rubber, and a layer, adjacent the butadiene acrylonitrile copolymer composition, of an unvulcanized compounded composition comprising a butadiene acrylonitrile copolymer and a lesser amount of natural rubber, each of said layers in said bonding means containing substantially the same amount of softener and the same vulcanizing ingredients, bringing the materials into good contact and then vulcanizing.

DONALD V. SARBACH.